United States Patent
Coburn, Jr. et al.

(10) Patent No.: US 6,858,669 B2
(45) Date of Patent: Feb. 22, 2005

(54) PLASTIC ARTICLE WITH COATING PROVIDING INCREASED MELTING POINT AND AN INCREASED TEMPERATURE INDUCED PLASTIC FLOW CHARACTERISTIC

(75) Inventors: Joseph W. Coburn, Jr., Jackson, NJ (US); Robert C. Weiss, Jackson, NJ (US)

(73) Assignee: Creative Film, Corp, Lakewood, NJ (US)

( * ) Notice: Subject to any disclaimer, the term of this patent is extended or adjusted under 35 U.S.C. 154(b) by 0 days.

(21) Appl. No.: 10/454,519

(22) Filed: Jun. 4, 2003

(65) Prior Publication Data

US 2004/0247877 A1 Dec. 9, 2004

(51) Int. Cl.[7] .............................................. C08G 63/91
(52) U.S. Cl. .......................... 525/21; 526/317.1; 430/1; 430/7; 359/361; 359/580; 359/885; 359/892
(58) Field of Search ................................. 359/885, 892, 359/580, 361; 430/7, 1; 526/317.1; 525/21

(56) References Cited

U.S. PATENT DOCUMENTS 6,535,341 B1    3/2003    Miller .................... 359/885

OTHER PUBLICATIONS

Rosco technotes 2a–4 pages, author/date unknown, but is prior art.

*Primary Examiner*—William K. Cheung
(74) *Attorney, Agent, or Firm*—R. Gale Rhodes, Jr.

(57) ABSTRACT

Plastic article having at least one side provided with a coating for increasing the melting point of the article and for increasing temperature induced plastic flow characteristic of the article. Process of and apparatus for manufacturing such article.

8 Claims, 1 Drawing Sheet

PLASTIC ARTICLE WITH COATING PROVIDING INCREASED MELTING POINT AND AN INCREASED TEMPERATURE INDUCED PLASTIC FLOW CHARACTERISTIC

BACKGROUND OF THE INVENTION

This invention relates to a plastic article provided with a coating which provides the plastic article with an increased melting point and an increased temperature induced plastic flow characteristic; i.e., an increase in the temperature at which the plastic article exhibits plastic flow. More particularly, this invention relates to a thermoplastic article provided with a coating of cured material which provides the thermoplastic article with an increased melting point and an increase in temperature induced plastic flow characteristic, and which thermoplastic article provided with such coating is particularly useful as a color light filter.

This invention further relates to apparatus and processes of manufacturing such plastic articles.

Numerous plastic articles, particularly thermoplastic articles are known to the art which have a melting point and which experience a heat induced plastic flow characteristic. By way of example, and not by way of limitation, thermoplastic color light filters are known to the art for providing a single color of light, upon white light comprised of a plurality of colors of light in the visible light spectrum being transmitted thereto. As is further known to the art, the color of light provided by color light filters is dependent upon the color of the light filter. Such color light filters are widely used in the entertainment field, such as for example, in stage theaters, outdoor shows and other applications where relatively bright colored light is desired or required. By way of further example, a typical color light filter includes a transparent, or at least substantially transparent plastic base material, such as for example a thermoplastic material such as polycarbonate, and which has either or both of its outer surfaces suitably coating with a colored dye or which can have colored dye defused into either or both of its outer surfaces. Alternatively, the colored dye can be dispersed throughout the thermoplastic base material. Upon such dye being, for example, a red dye, the color light filter will be a red color light filter and will produce red light upon white light being transmitted to the red color light filter. The red color light filter will permit only red light to pass therethrough and the red color dye will block or absorb all other colors in the white light and prevent them from passing through the red color light filter.

As is further known to the art, and by way of further example, the red color light filter in absorbing the other light colors will become heated and can become sufficiently heated to reach the melting point of the thermoplastic material, causing the color light filter to be destroyed. Further, as is known, as the colored light filter becomes increasingly heated the thermoplastic material, will experience a heat induced plastic flow characteristic which can distort the shape of the filter thereby distorting the colored light produced by the color light filter, such heat induced plastic flow characteristic can ultimately cause the filter to be destroyed.

Accordingly, there is a need in the art for a new and improved plastic article which is provided with an increased melting point and an increased temperature induced plastic flow characteristic and which plastic article can be used as a color light filter. There is a further need in the art for a process and apparatus for manufacturing such plastic article.

SUMMARY OF THE INVENTION

Plastic article having at least one side provided with a cured coating for increasing the melting point of the article and for increasing the temperature induced plastic flow characteristic of the article. Process of and apparatus for manufacturing such article.

DESCRIPTION OF THE PREFERRED EMBODIMENTS

Figure 1:
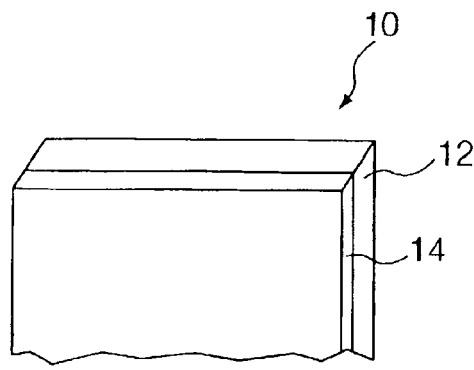
FIG. 1 is a partial perspective view of the first embodiment of the plastic article of the present invention.

A first embodiment of a plastic article embodying the present invention is illustrated in perspective in FIG. 1 and indicated by general numerical designation 10. Plastic article 10 includes a layer of thermoplastic material 12 and a coating 14 applied to one side of the thermoplastic material. The thermoplastic material 12 may be polycarbonate or a fire retardant grade of polycarbonate containing bromine. The coating 14 may be a UV (ultraviolet) cured coating or an infrared cured coating, i.e., a coating applied in liquid, or at least substantially liquid, form and cured by UV or infrared. Alternatively, the coating 14 will be an infrared cured acrylic coating or an electronic beam cured acrylic coating.

Figure 2:
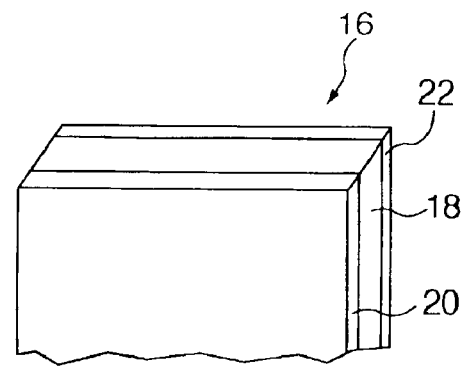
FIG. 2 is a partial perspective view of the second embodiment of the plastic article of the present invention.

An alternate plastic article embodiment of the present invention is illustrated in perspective in FIG. 2 and indicated by general numerical designation 16. Plastic article 16 includes a layer of thermoplastic material 18, such as polycarbonate or a fire retardant grade of polycarbonate containing bromine. In this embodiment, the layer of thermoplastic material 18 has both, or opposite, sides coated with a coating, namely, coatings 21 and 22. The coatings 20 and 22 may be any of the coatings 14 described above with regard to the plastic article 10 of FIG. 1.

Figure 3A:
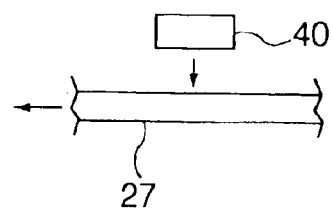
FIG. 3 is a diagrammatical illustration of apparatus suitable for practicing the process of the present invention of manufacturing the plastic article of the present invention.
Figure 3:
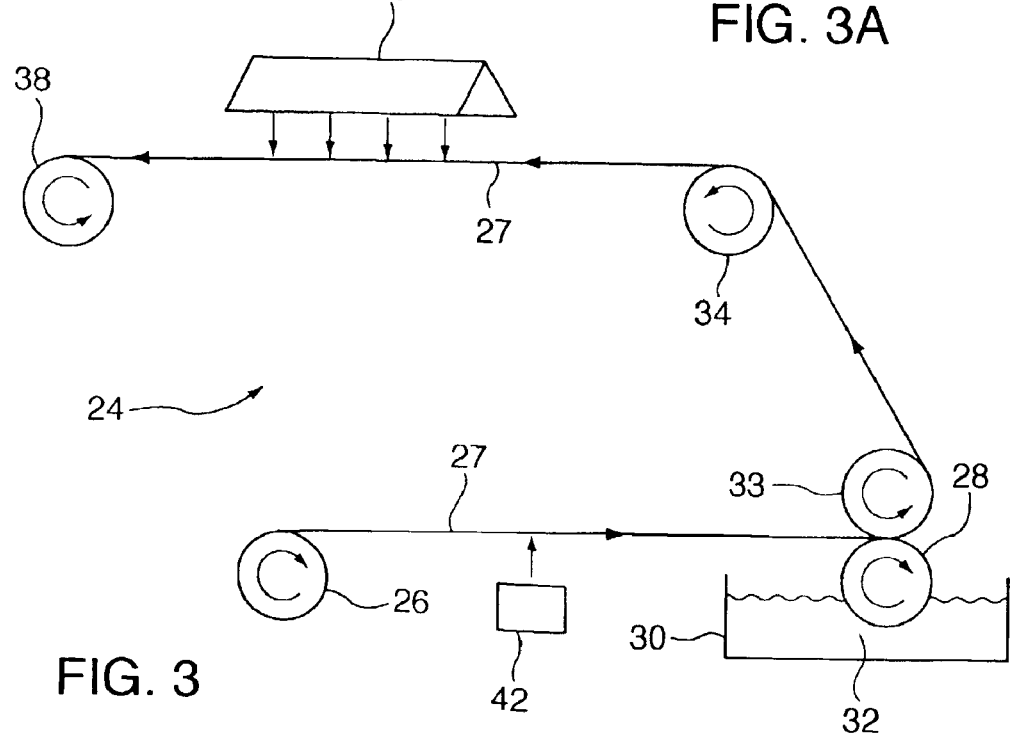

Referring now to FIG. 3, apparatus embodying the present invention, and for practicing the process of the present invention, namely, for manufacturing the plastic article 10 of FIG. 1 of the present invention is illustrated diagrammatically in FIG. 3 and such apparatus indicated by general numerical designation 24. Apparatus 24 may include a feed roll 26 for feeding a layer or film of thermoplastic material 27, a transfer or embossed roll 28, sometimes referred to as a gravure roll, a container or vessel 30 for containing a supply or quantity of coating material 32, a backup roll 33, an intermediate roll 34, a curing unit such as a source of UV or infrared light or energy 36, and a take-up roll 38. The transfer or embossed roll 28, sometimes referred to in the art as noted above as a gravure roll, is provided on its outer surface with inwardly extending ridges, cavities or the like, to facilitate the taking up and transfer of the coating material 32 to the bottom surface or underside of the thermoplastic material 27.

In practicing the process of the present invention for manufacturing the plastic article 10 of FIG. 1, and referring again to FIG. 3, thermoplastic material 27, such as the above-noted polycarbonate or fire retardant grade polycarbonate containing bromine, is fed from the feed roll 16 between the transfer roll 28 and the backup roll 33 to cause the transfer roll 28 to apply curable coating material 32 to the underside of the thermoplastic material 27. Thereafter, the thermoplastic material 27 having the curable coating material 32 applied to the underside thereof, is passed over the intermediate roll 34 and passed underneath the curing unit 36. Upon the coating material 32 being a UV curable coating, the unit 36 will be a source of UV which will apply such UV light or energy to the coating to cure the coating. Upon the coating 32 of FIG. 3 being infrared curable material, the unit 36 will be a source of infrared light or heat so as to cure the infrared curable coating. Further, upon the coating material 32 being an acrylic, such as an infrared curable acrylic, the unit 33 will again be a source of infrared light or heat for curing the infrared curable acrylic. Alternatively, upon the coating material 32 of FIG. 3 being an electron beam curable acrylic, the apparatus 24 of the present invention may include an electron beam source 40 as illustrated diagrammatically in FIG. 3A for applying an electron beam to such acrylic for curing. Accordingly, it will be further understood, that the manufacturing process of the present invention may include the further step of applying an electron beam to the electron beam curable acrylic coating to cure the same.

Still further, referring again to FIG. 3, the apparatus of the present invention may further include a corona treating unit 42 for practicing a further manufacturing process step of the present invention of corona treating the underside of the thermoplastic material 27 prior to coating to enhance the application of the coating material 32 to the thermoplastic material.

To produce the double-side coated plastic article 16 of FIG. 2, the single-side coated thermoplastic material of FIG. 1 is taken from the take-up roll 38 and rewound onto another feed roll to place the coated underside on top whereafter the thermoplastic material having its now top side previously coated is fed into the apparatus 24 of FIG. 3 to apply a coating to the underside of the thermoplastic material in accordance with any of the manufacturing processes of the present invention described above, to produce the double-sided coated plastic article 16 of FIG. 2.

It will be further understood, that the plastic article 10 of FIG. 1 and the plastic article 16 of FIG. 2 may be cut, by suitable coating apparatus known to the art, into further plastic articles of smaller or different sizes or shapes.

It will be further understood, as noted generally above, that the apparatus 24 of the present invention, and the above-described manufacturing processes of the present invention, are particularly useful for providing color light filters having an increased melting point and an increased temperature induced plastic flow characteristic. For this, it will be understood, that the thermoplastic material 27 of FIG. 3 will be a dye colored thermoplastic material, such as a dye colored thermoplastic carbonate or a dye colored fire retardant grade of polycarbonate containing bromine with such material being dyed as described above in the BACKGROUND OF THE INVENTION. Such dye colored thermoplastic material will be wound on the feed roll 26 of FIG. 3 and either one or both sides of the dye colored thermoplastic material will be coated with any of the curable coatings taught above in accordance with the manufacturing processes taught above. Accordingly, it will be understood that in this embodiment or application, the layer of thermoplastic material 12 of FIG. 1 will be a dye colored layer of the above-noted thermoplastic material and the coating 14 of FIG. 1 will be any of the coatings described above. Similarly, with regard to FIG. 2, it will be understood that the thermoplastic material 18 of FIG. 2 will be a dye colored layer of the above-noted thermoplastic material and the coatings 20 and 22 will each be any one of the coatings described above. However, it will be understood that in producing color light filters the curable coatings will be substantially clear curable coating material.

One-half of one side of a piece of polycarbonate material was coated with UV curable coating material obtained from the Sony Corporation, Mt. Pleasant, Pa., and sold under the trade name SK6300. The coating material was cured with UV and both sides were exposed to a common heat source. The uncoated side experienced temperature induced plastic flow characteristics before and, therefore, at a lower temperature than did the coated side, and the uncoated side experienced melting before, and, therefore at a lower temperature than did the coated side. This established that the polycarbonate provided with the cured UV coating material had an increased melting point and an increased temperature induced plastic flow characteristic.

It will be understood that many variations and modifications may be made in the present invention without departing from the spirit and scope thereof.

What is claimed is:

1. Color light filter, comprising:
   a layer of dye colored thermoplastic material having a melting point and a temperature induced plastic flow characteristic; and
   a substantially clear cured coating applied to at least one side of said thermoplastic material for increasing said melting point and for increasing said temperature induced plastic flow characteristic of said layer of thermoplastic material.

2. The color light filter according to claim 1 wherein said layer of dye colored thermoplastic material a layer of dye colored polycarbonate.

3. Color light filter, comprising:
   a layer of dye colored fire retardant grade polycarbonate containing bromine having a melting point and a temperature induced plastic flow characteristic;
   a substantially clear cured coating applied to at least one side of said layer of dye colored fire retardant grade polycarbonate containing brome for increasing said melting point and for increasing said temperature induced plastic flow characteristic of said layer of dye colored fire retardant grade polycarbonate containing bromine.

4. Color light filter, comprising:
   a layer of dye colored thermoplastic material having a melting point and a temperature induced plastic flow characteristic; and
   a substantially clear cured coating applied to at least one side of said thermoplastic material for increasing said melting point and for increasing said temperature induced plastic flow characteristic of said layer of thermoplastic material, and wherein said coating is a substantially clear cured coating of UV curable coating material.

5. Color light filter, comprising:
   a layer of dye colored thermoplastic material having a melting point and a temperature induced plastic flow characteristic; and
   a substantially clear cured coating applied to at least one side of said thermoplastic material for increasing said melting point and for increasing said temperature induced plastic flow characteristic of said layer of thermoplastic material, and wherein said coating is a substantially clear infrared cured coating of infrared curable coating material.

6. Color light filter, comprising:

a layer of dye colored thermoplastic material having a melting point and a temperature induced plastic flow characteristic; and a substantially clear cured coating applied to at least one side of said thermoplastic material for increasing said melting point and for increasing said temperature induced plastic flow characteristic of said layer of thermoplastic material, and wherein said coating is a substantially clear infrared cured coating of infrared curable acrylic coating material.

7. Color light filter, comprising:

a layer of dye colored thermoplastic material having a melting point and a temperature induced plastic flow characteristic; and a substantially clear cured coating applied to at least one side of said thermoplastic material for increasing said melting point and for increasing said temperature induced plastic flow characteristic of said layer of thermoplastic material, and wherein said coating is a substantially clear electron beam cured coating of electron beam curable acrylic coating material.

8. Color light filter, comprising:

a layer of dye colored thermoplastic material having a melting point and a temperature induced plastic flow characteristic;

a substantially clear cured coating applied to at least one side of said thermoplastic material for increasing said melting point and for increasing said temperature induced plastic flow characteristic of said layer of thermoplastic material; and a second coating applied to the other side of said thermoplastic material for further increasing said melting point and for increasing said temperature induced plastic flow characteristic.

* * * * *